United States Patent

Nevala

[15] 3,644,868

[45] Feb. 22, 1972

[54] MODULE HOLDER

[72] Inventor: David Nevala, Hudson, Mass.

[73] Assignee: Digital Equipment Corporation, Maynard, Mass.

[22] Filed: Apr. 27, 1970

[21] Appl. No.: 31,926

[52] U.S. Cl. ................339/17 LM, 174/138 G, 317/101 DH, 339/36, 339/66 M, 339/198 J

[51] Int. Cl. ..........................................H02b 1/02, H05k 1/02

[58] Field of Search ..................339/17 LM, 17 M, 38, 39, 36, 339/148.2, 59 R, 59 M, 65, 66 R, 66 M; 317/101 CB, 101 DH, 101 D; 174/138 F, 138 G; 211/41

[56] References Cited

UNITED STATES PATENTS

| | | | |
|---|---|---|---|
| 3,382,476 | 5/1968 | Nouet | 317/101 DH X |
| 3,320,483 | 5/1967 | Pohl | 317/99 |

FOREIGN PATENTS OR APPLICATIONS

| | | | |
|---|---|---|---|
| 52,439 | 10/1965 | Germany | 317/101 DH |
| 1,433,636 | 2/1966 | France | 317/101 DH |
| 1,252,262 | 10/1967 | Germany | 339/59 M |
| 1,070,926 | 6/1967 | Great Britain | 339/59 M |

OTHER PUBLICATIONS

IBM Technical Disclosure Bulletin, Vol. 11, No. 12, 5-1969 " Air Bag" By D. E. Rutter, Sr. page 1694.

Electrical World Magazine, Apr. 25, 1960 issue, page 95 Article entitled " Rubber Cover"

Electrical World Magazine June 22, 1960 issue, page 138 Article entitled " Terminal Block Covers....667"

*Primary Examiner*—Marvin A. Champion
*Assistant Examiner*—Terrell P. Lewis
*Attorney*—Cesari and McKenna

[57] ABSTRACT

A holder for retaining plug-in printed circuit cards arranged side-by-side in rows or tiers comprises a stiff but resilient strip having spaced-apart grippers projecting out from one face thereof. The grippers are spaced apart a distance equal to the spacing between the cards and each gripper is arranged to grip the edge of a card. Each gripper consists of a pair of spaced-apart fingers which resiliently engage opposite faces of the card. The strip is hinged between the fingers of each gripper so that when the holder is pulled away from the cards, the strip bends backwards, spreading apart the fingers of each gripper so as to release the intervening card.

7 Claims, 3 Drawing Figures

PATENTED FEB 22 1972

3,644,868

INVENTOR
DAVID NEVALA
BY
Cesari and McKenna
ATTORNEYS

MODULE HOLDER

BACKGROUND OF THE INVENTION

This invention relates to a holder for retaining printed circuit cards in their proper positions in an electrical system.

In present-day electrical equipment such as data processing systems and the like, many electrical components are very often mounted and wired together on printed circuit cards which plug into connector blocks. As a rule, several of these cards are arranged in tiers in these blocks.

Oftentimes, these cards tend to slip out of their connector blocks to a greater or lesser extent so that they become cocked. This is particularly so if the system is jostled or bumped during handling and use, or if the cards themselves are relatively long so that they exert a considerable moment on their resilient connections to the connector blocks. When such displacement of the cards occurs, the uninsulated components on one card have an opportunity to contact the uninsulated printed circuit paths and contacts on an adjacent card causing short circuits. In other instances, a card may cock to such an extent that one or more of its connections with the connector block are disrupted. Both of these eventualities change the system's electrical characteristics so that it no longer operates properly. Also, in some cases, a short circuit created in this fashion may cause serious damage to other components in the system.

SUMMARY OF THE INVENTION

Accordingly, an object of the present invention is to provide improved apparatus for retaining printed circuit cards in their proper positions.

Another object of the invention is to provide a holder for properly spacing rows and columns of printed circuit cards.

Yet another object of the invention is to provide a holder of the above type which is easily installed without any spacial tools or equipment.

A further object of the invention is to provide a holder of the above type which securely retains the cards yet which can be removed relatively easily when it is necessary to repair or replace a particular card.

Another object of the invention is to provide a holder of the above type which is easy and inexpensive to manufacture.

Other objects will in part be obvious and will in part appear hereinafter.

The invention accordingly comprises the features of construction, combination of elements and arrangement of parts which will be exemplified in the following detailed disclosure, and the scope of the invention will be indicated in the claims.

Briefly, the holder is molded of a relatively stiff but resilient plastic material such as polypropylene. It comprises a generally rectangular strip having one or more rows of grippers projecting from one side thereof. The spacing between the grippers in each row corresponds to the spacing between the cards in each row and there is also correspondence between the spacings of the gripper rows and the card rows. Each gripper is arranged to grip the edge of a card. More particularly, each gripper comprises a pair of spaced-apart fingers which are arranged to engage opposite faces of the card. In use, the holder is positioned adjacent the edges of the cards in a row or tier so that a gripper is disposed opposite each such card edge. Then the holder is pressed against the cards so that the grippers engage over the card edges.

Preferably, at least one of the fingers in each gripper carries a nose or projection which is arranged to engage in a registering notch in the card face when the gripper is in place. This securely locks the holder to all of the cards.

When the holder is properly positioned as aforesaid, the cards are all held apart from one another. Furthermore, the cards in each row are all tied together as well as to the row of cards directly above or below in the tier, with the result that there is far less tendency for an individual card to pull out of its connector block. In other words, the holders which tie the cards in the tier together have a synergistic supportive effect which tends to retain cards which might otherwise tend to slip out of their connector blocks.

In order to facilitate disengaging the holder from the printed circuit cards, the strip thereof is more or less hinged at each gripper so that when one grasps an end of the strip and pulls it away from the cards, the strip folds or bends outward so that the two fingers in each gripper move apart and release the intervening card. Thus, each holder can be stripped away quickly and easily when it is necessary to replace one of the cards.

The subject holder constitutes a valuable and sometimes nearly indispensible accessory for electrical panels composed of tiers of printed circuit cards. The holders are able to maintain all of the cards in the tier in their correct positions, even though the system is jostled and bumped in handling and use. Yet, the holders do not add appreciably to the overall cost of the system and do not interfere with the speedy repair and replacement of the parts thereof.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figures 1, 2, 3:
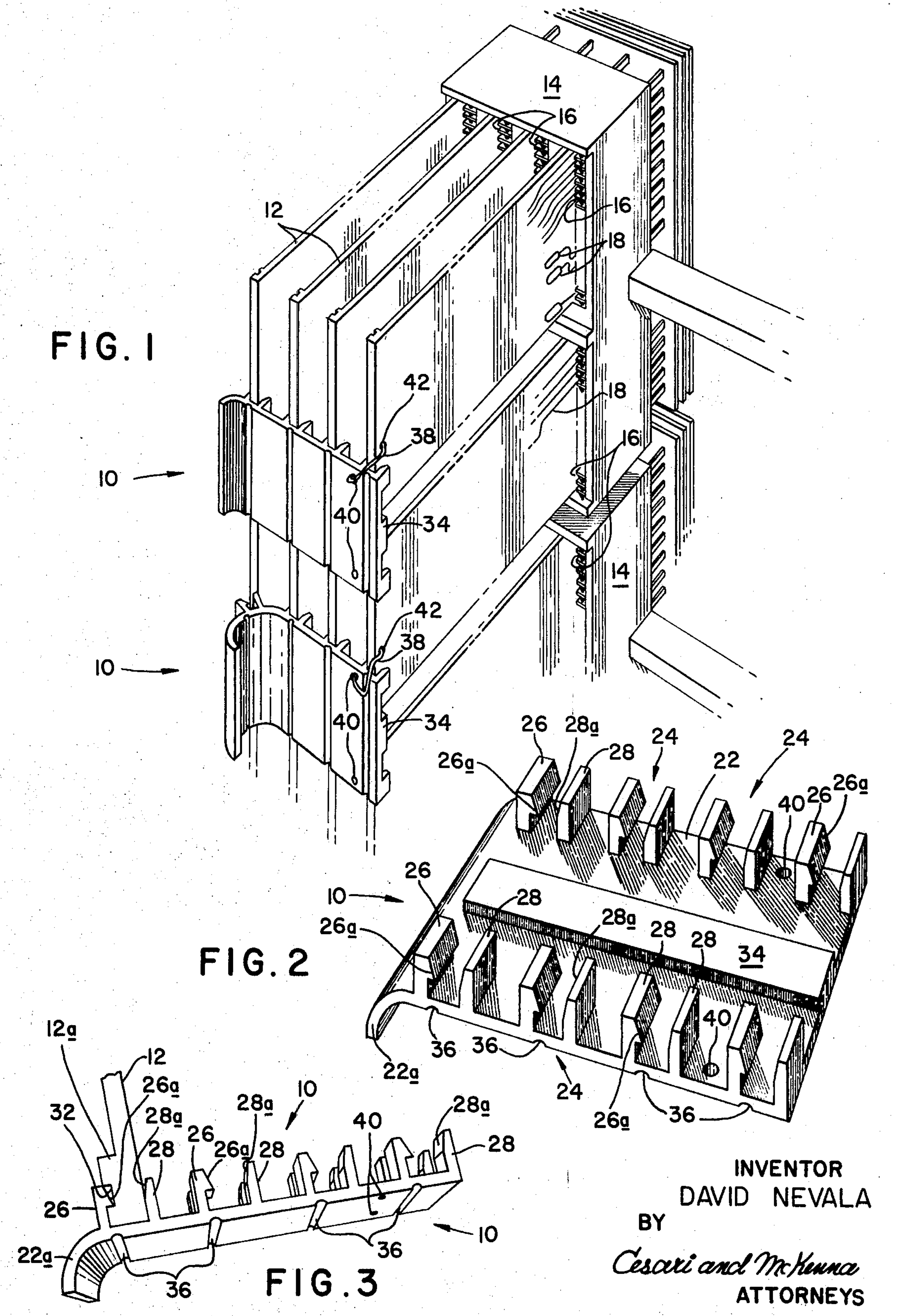
FIG. 1 is a fragmentary isometric view of a tier of printed circuit cards which are retained in place by holders embodying the principles of this invention.
FIG. 2 is an isometric view from the rear on a larger scale of the holder.
FIG. 3 is a similar view from the side showing in greater detail the engagement of a holder with a printed circuit card.

Turning now to FIG. 1 of the drawing, the holder indicated generally at 10 retains the free ends 12*a* (FIG. 3) of printed circuit cards 12 arranged in tiers and supported by connector blocks 14. The cards are the plug-in type which fit into slots 16 in the connector blocks and are retained therein by spring contacts which are also connected electrically to the various printed circuit paths 18 on the cards.

Turning now to FIG. 2, holder 10 is a unitary machined or molded structure made of a suitable, relatively stiff but resilient plastic such as polypropylene. It includes a generally rectangular strip 22 and a plurality of grippers indicated generally at 24 projecting out from one face of strip 22. The holder specifically illustrated herein has two horizontal rows of four vertically oriented grippers 24 with the grippers in each row being positioned one above the other. Thus, each holder 10 is able to retain a tier of eight cards composed of two card rows of four cards each.

The grippers 24 in each row are spaced apart by a distance corresponding to the spacing between the individual cards 12 shown in FIG. 1. In addition, the grippers 24 in the upper and lower rows are themselves spaced apart by a distance equal at least to the spacing between the rows of cards in FIG. 1.

Each gripper comprises a pair of spaced parallel fingers 26 and 28. These fingers are spaced apart by a distance slightly less than the thickness of the card end 12*a* (FIG. 3). Thus, when a card is inserted between them, they are spread apart somewhat so that they tend to squeeze the card between them.

Turning now to FIG. 3, each finger 26 has a nose 26*a* which projects towards its corresponding finger 28. Nose 28*a* interfits with a transverse channel or notch 32 formed near the end 12*a* of each printed circuit card 12 on the side thereof facing finger 26. When the holder is installed, each gripper is pressed down on the end of the corresponding printed circuit card so that the fingers thereof are forced apart. The nose 26*a* is beveled as is the end portion 28*a* of finger 28 to facilitate forcing the gripper over the end of the card. As the holder is pressed into place, the nose 26*a* of each gripper snaps into place in the opposing channel 32, thereby securely retaining the holder on the cards. All of the grippers are thus engaged over the opposing ends of the cards in the tier as shown in FIG. 1.

In a preferred embodiment of the invention, strip 22 includes a generally rectangular longitudinal rib 34 extending between the rows of grippers 24 as best seen in FIG. 2. When the holder 10 is seated as shown in FIG. 1, rib 34 projects out between two rows of cards 12 in the tier so as to help maintain the proper spacing between the cards in the two rows. The width of rib 34 depends upon the row spacing. Also, in some applications, i.e., where the cards in the two rows are very close together, the rib 34 may be omitted entirely.

Still referring to FIG. 3, the strip 22 contains a series of hinges 36 which extend parallel to the grippers to facilitate removal of the holder when it is desired to repair or replace one of the underlying cards. These hinges take the form of channels or grooves on the opposite face of strip 22 from the grippers. There is a hinge 36 located between the fingers in each gripper, i.e., four in the illustrated holder.

When one desires to remove the holder 10, one simply grasps the end of strip 22 and pulls it away from the cards. For this purpose, the strip 22 preferably includes an outwardly curved tab or extension **22*a* at the end thereof adjacent a finger 26. The strip 22 folds or bends backwards at each hinge 36 so that the fingers 26 and 28 of each successive gripper are drawn apart so as to disengage nose 26*a* from channel 32 and release the intervening card 12**.

The holder does not have to be removed completely if the maintenance personnel simply seek access to a card relatively near tab **22*a*. In other words, the holder 10 can be retained temporarily simply by the engagement of the last gripper 24, i.e., the one to the extreme right in FIG. 1**. Then when the work is completed, the holder can be reinstalled on the remaining cards in the row or tier.

Returning briefly to FIG. 1, there may be a tendency for the holder 10 to become lost upon removal by maintenance personnel. Also, these personnel may forget to replace the holder once their work is done. Accordingly, to avoid this, a preferred holder embodiment is anchored to one of the cards 12 in the tier by means of a tether 38 connected to an eyelet 40 in strip 22 and a similar eyelet 42 in one of the cards 12. With the holder tied to the cards in this fashion, it cannot become lost and the fact that it has not been replaced is readily apparent. Accordingly, the maintenance personnel are more apt to replace it after their work is done.

It will be seen from the foregoing then that the subject module holder performs a very useful function in electrical circuits composed of tiers of printed circuit cards. It helps to retain these cards in place and also prevents various components on the cards from being short circuited by adjacent cards which may be displaced because of their own weight or because of the overall system being shaken or jostled. Still, the holder is relatively inexpensive to make. Moreover, it is easily installed and removed by authorized personnel so that it does not interfere with the routine maintenance work being done on the equipment.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:

1. A holder for retaining a row of printed circuit cards spaced-apart face-to-face and plugged into a connector block comprising A. a strip of relatively stiff material, B. two or more spaced-apart rows of grippers having a plurality of grippers in each row, the grippers in each row 1. projecting out from one face of the strip,
2. being spaced apart by a distance approximately equal to the distance between the cards, and
3. each gripper being composed of a pair of spaced-apart, relatively stiff fingers, the strip being arranged to be pressed against the corresponding edges of the cards in the row so that the fingers of each gripper engage opposite sides of one of the cards so as to prevent the cards from moving toward or away from one another, and C. a rib projecting from the strip between each row of grippers and arranged to function as a spacer between two rows of printed circuit cards so that the holder can retain two or more rows of printed circuit cards arranged in a tier.

2. A card-holding system for retaining a row of printed circuit cards spaced-apart face-to-face and plugged into a connector block comprising A. two or more printed circuit cards, B. a strip of relatively stiff material, and C. a plurality of grippers 1. projecting out from one face of the strip,
2. spaced apart by a distance approximately equal to the distance between the cards, and
3. each composed of a pair of spaced-apart, relatively stiff fingers, the strip being arranged to be pressed against the corresponding edges of the cards in the row so that the fingers of each gripper engage opposite sides of one of the cards with the cards and at least one finger in each gripper engaging a card having interfitting portions which lock the strip onto the cards so as to prevent the cards from moving toward or away from one another.

3. The holding system defined in claim 2 and further including a handle at one end of the strip to facilitate removal of the holder.

4. The holding system defined in claim 2 and further including opposing bevels on the fingers in each gripper to facilitate engagement of the gripper with a printed circuit card.

5. A card-holding system for retaining a row of printed circuit cards spaced-apart face-to-face and plugged into a connector block comprising A. two or more printed circuit cards, B. a strip of relatively stiff material, and C. a plurality of grippers 1. projecting out from one face of the strip,
2. spaced apart by a distance approximately equal to the distance between the cards, and
3. each composed of a pair of spaced-apart, relatively stiff fingers, the strip being arranged to be pressed against the corresponding edges of the cards in the row so that the fingers of each gripper engage opposite sides of one of the cards so as to prevent the cards from moving toward or away from one another, said strip being hinged between the fingers in each gripper so that when the strip is pulled away from the row of cards, the strip bends back so as to spread apart the fingers in each gripper, thereby releasing the printed circuit card between them.

6. The holder defined in claim 5 and further including means connected to the holder for tethering it to a printed circuit card to prevent it from becoming lost.

7. The holding system defined in claim 5 wherein the strip has two or more spaced-apart rows of said grippers so that the holder can retain two or more rows of printed circuit cards arranged in a tier.

* * * * *